United States Patent [19]

Hodson

[11] 4,357,705

[45] Nov. 2, 1982

[54] MULTI-SOURCE LASER BEAM MODULE

[75] Inventor: Donald R. Hodson, Thousand Oaks, Calif.

[73] Assignee: Rockwell International Corporation, El Segundo, Calif.

[21] Appl. No.: 166,009

[22] Filed: Jul. 7, 1980

[51] Int. Cl.$^3$ .............................................. H01S 3/23
[52] U.S. Cl. .................................................. 372/109
[58] Field of Search ...................... 331/94.5 C, 94.5 D, 331/94.5 G; 330/4.3

[56] References Cited

U.S. PATENT DOCUMENTS 3,541,468  11/1970  Hammond, Jr. et al. ........... 330/4.3
4,217,558   8/1980  Aprahamian et al. .............. 330/4.3

OTHER PUBLICATIONS

"Conceptual Design of an Angular Multiplexed 50-kJ KrF Amplifier For ICF," By Lowenthal et al.

Primary Examiner—William L. Sikes
Assistant Examiner—Leon Scott, Jr.
Attorney, Agent, or Firm—H. Fredrick Hamann; Harry B. Field

[57] ABSTRACT

A module for generating multiple high energy laser beams of different frequencies and directing the beams at a target. The beams are formed from a plurality of separate laser cavities, and directed by a mirror system within an evacuated chamber at a photochemical reaction cavity within the chamber. The laser cavities are also positioned within the chamber, and cavities generating laser beams of one frequency are connected by a common duct for circulating a lasing gas through the cavities. A mirror system allows beams from selected cavities to be combined, permitting extra lasers to be substituted optically without removal from the evacuated chamber.

5 Claims, 4 Drawing Figures

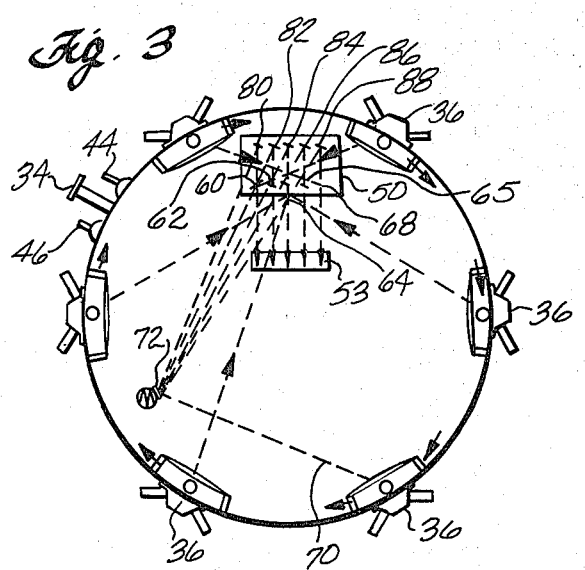
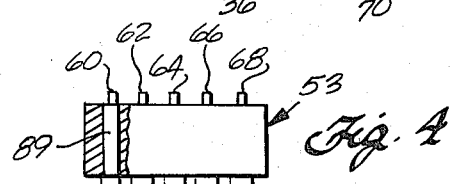
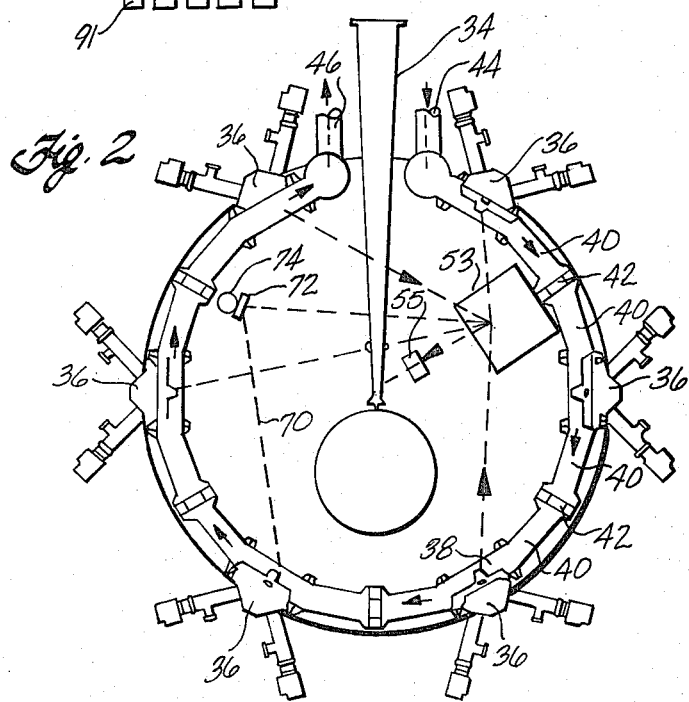

MULTI-SOURCE LASER BEAM MODULE

FIELD OF THE INVENTION

This invention relates to multiple beam laser sources, and more particularly, is concerned with a module for generating and delivering high power laser beams to a common target.

BACKGROUND OF THE INVENTION

The use of high energy laser beams to produce photochemical reactions is known. For example, copending application Ser. No. 302,348 filed Sept. 15, 1981 entitled "Photochemical Reaction Cavity" by the same inventor describes a cavity for interacting ultraviolet and infrared radiation with gas molecules as part of a photochemical process. To achieve high efficiency in such a process, the laser beams must be generated and directed into the cavity with a minimum of energy loss. The present invention is directed to a beam generating module which delivers multiple beams of more than one frequency to such a cavity or other target in a highly efficient, optically accurate, and reliable manner.

SUMMARY OF THE INVENTION

The present invention provides a plurality of laser beam generators mounted within a common evacuated housing in which the target is also mounted. The beams are optically combined within the housing without passing the beams through energy absorbing windows. The optical system is supported from a common optical table for accurate alignment. Multiple gas lasers are operated within the housing by circulating a single gas stream through the laser cavities. The optical system allows the beam from a spare laser to be switched from outside the housing to the path of any of the beams from the other cavities within the housing, so that on failure of any of the lasers, another beam can be substituted without interruption of the operation.

These and other advantages of the present invention are achieved by providing a housing forming an airtight chamber in which are mounted in the outer wall thereof a plurality of arcuately spaced gas lasers. The resonators are connected serially by ducts through which the lasing gas is circulated. A mirror system directs the beams.

BRIEF DESCRIPTION OF THE DRAWINGS

For a better understanding of the invention reference should be made to the accompanying drawings, wherein:

FIG. 2 is a cross-sectional view taken substantially on the line 2—2 of FIG. 1;

FIG. 3 is a plan view of the multiple beam swing mirror arrangement; and

FIG. 4 is a detailed view, partly in section, of the retractable mirror assembly.

DETAILED DESCRIPTION

Figure 1:
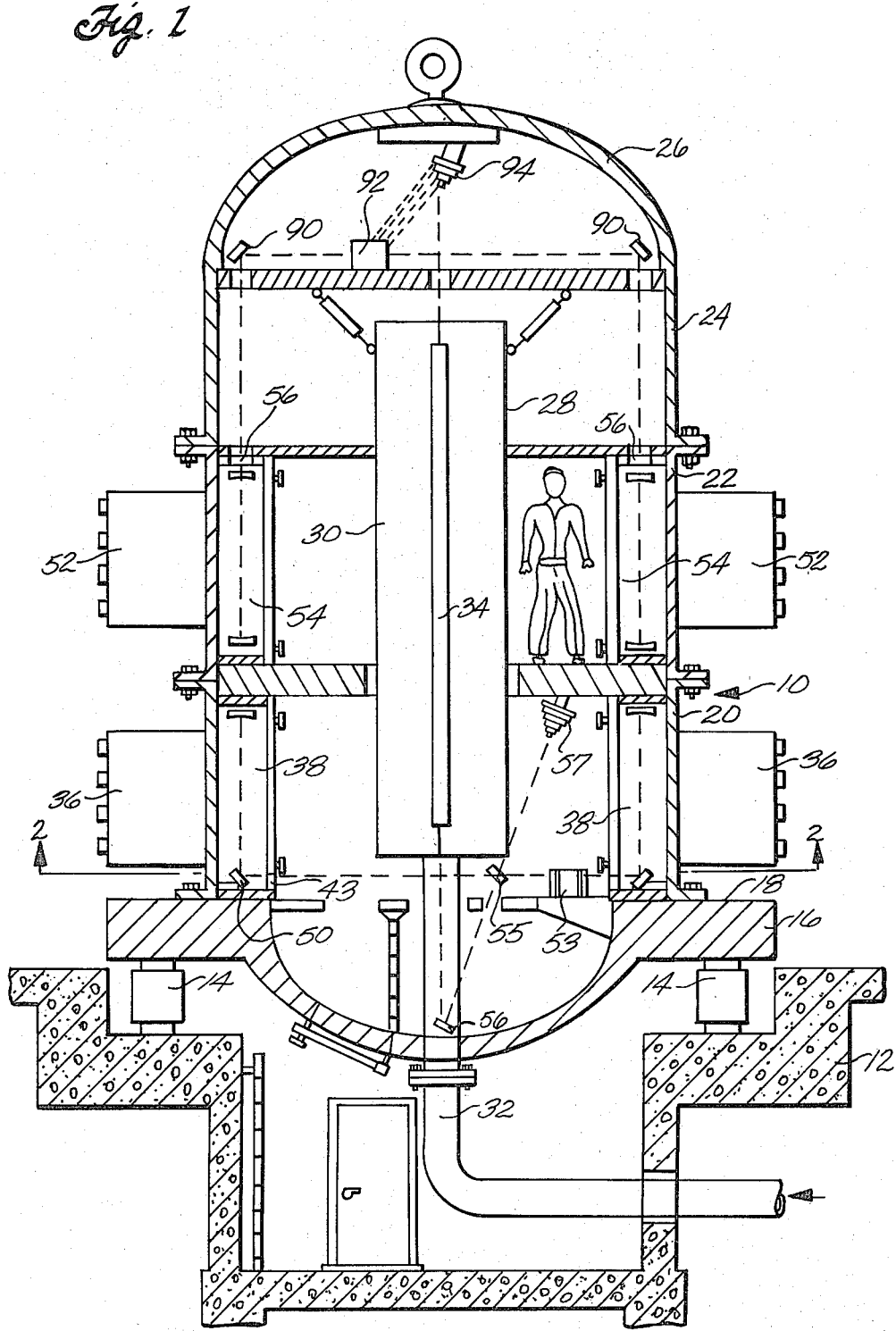
FIG. 1 is a sectional view of the multi-beam module of the present invention.

Referring to FIG. 1 in detail, the module assembly, indicated generally at 10, is supported from a suitable concrete foundation 12 by a plurality of vibration isolation mounts 14. The module 10 includes a base 16 which rests on the vibration isolation mounts 14. The base has a top surface 18 which serves as an optical bench. Mounted on top of the base 16 is a housing which includes three cylindrical sections, a lower section 20, an intermediate cylindrical section 22 and an upper cylindrical section 24 having an integral dome 26 forming the top of the housing. Each section is provided with flanges for bolting the respective sections to each other and to the base 16 to form a gas-tight chamber.

Supported in the center of the chamber is a photochemical reaction vessel 28, preferably of the type described in the above-identified copending application. The vessel includes a gas inlet plenum 30 which receives a reaction gas through an inlet pipe 32 extending upwardly through the base 16. Reaction gas is released from the plenum through an optical cavity 32 where it is exposed to light beams of ultraviolet and infrared radiation, for example, in a manner as hereinafter described. After passing through the cavity, the reaction gas exits through a diffuser 34 extending radially outwardly through the chamber wall.

Two groups of lasers are provided and are mounted respectively in the housing sections 20 and 22. As best seen in FIG. 2, the lower group of lasers includes six laser heads 36 arcuately spaced around the periphery of the chamber. Each laser head 36 is removably attached to a laser resonator 38. A laser gas, such as $CO_2$ or $KrF$, is circulated through the resonators through a common duct comprising sections 40 coupled together by heat exchangers 42 which operate to cool the laser gas as it circulates through the ducts and the laser resonator. An inlet pipe 44 directs the laser gas into the first resonator while an outlet pipe 46 receives the gas after it passes through the last resonator of the six lasers. The ducts and resonators form a ring which is integral with the wall of the housing to provide a gas-tight chamber within the module 10.

Each laser in the group operates to stimulate a lasing action in the gas as it passes through the resonator for generating a laser beam directed along a vertical axis, as best seen in FIG. 1. The beams from the lower group of lasers are directed downwardly and then out of the resonators horizontally through windows 48 in the walls of the resonators by mirrors 50. The six lasers 36, 38 are pulsed sequentially so that the six laser beams are pulsed sequentially.

A second group of gas lasers, indicated at 52, which also may be six in number, are mounted at equally spaced stations around the wall of the intermediate section 22 of the housing. The lasers include resonators 54 through which a lasing gas is circulated by means of a series of ducts in the same manner as described below in connection with FIG. 2. By circulating different gases through the two groups of lasers, the lasers in the two groups may produce beams of two different wavelengths. The beams generated in the resonators 54 are directed vertically through windows 56 in the top wall of the resonators.

The laser beams from the first group of lasers 36, 38 are directed at a first group of mirrors 53 which reflects five of the six laser beams along closely spaced parallel paths to another group of mirrors 55. The group of mirrors 55 direct the parallel beams to a beam multiplexer 57 of the type described in copending application Ser. No. 138,057 filed Apr. 7, 1980, entitled "Laser Beam Power Multiplication" by the same inventor as the present application. The multiplexer receives the five multiple parallel beams and directs them in time sequence along a common axis directed downwardly to a mirror 59. The mirror 59 directs the time multiplexed beam into the cavity 34 where it is absorbed by the reaction gas.

Referring to FIG. 3, the optical arrangement of the group of mirrors 53 and 55 is shown in more detail. The group of mirrors 53 includes five individual mirrors 60, 62, 64, 66 and 68. These five mirrors are positioned to intercept laser beams from five of the six lasers 36, the sixth laser being used as a spare. The five laser beams as reflected by the mirrors 60–68 lie substantially in a common horizontal plane. The five beams reflected by the mirrors 60–68 are directed along spaced parallel paths which are intercepted by the reflecting surface of the mirror 55, the mirror 55 redirecting the five beams at the multiplexer 57.

The beam from the sixth or spare laser, indicated at 70 in FIG. 3, is directed at a spare beam mirror 72. The mirror 72 is mounted on the shaft of a stepping motor 74 mounted within the evacuated chamber. The stepping motor 74 can be indexed electrically to change the angle of the mirror 72 so as to direct the reflected beam along any one of five separate paths, depending on the setting of the stepping motor 74. The five beam paths are directed respectively at a group of five mirrors 80, 82, 84, 86 and 88 located behind the mirrors 60–68. The mirrors 80–88 reflect the respective beams along any one of the same five paths of light reflected from the mirrors 60–68 toward the mirrors 52. As shown in FIG. 4, each of the mirrors 60–68 is mounted on a retractable support 89, allowing the mirrors to be individually lowered out of the way by an associated motor, solenoid or other suitable remotely controlled drive mechanism 91, thus allowing any one of the mirrors to be rotated out of the path of the reflected beam from any of the mirrors 80–88. By this arrangement, if any one of the five lasers fails during operation of the equipment, the beam from the spare laser can be substituted for the beam from the failed laser by setting the mirror 72 to the appropriate angular position and retracting one of the mirrors 60–68 out of the way.

A similar optical arrangement can be provided for the beams from the other group of lasers 52–54. Again, each of the laser beams is directed by means of mirrors 90 in a common horizontal plane to a mirror assembly 92 similar to the group of mirrors 53 described above. The beams from five of the lasers are directed along five parallel paths to a multiplexer 94 which redirects the beams in a single multiplexed beam path directed at the cavity 34. The sixth laser can be used as a spare in the same manner as described above in connection with FIG. 3.

From the above description, it will be seen that a laser beam module is provided for generating high energy laser beams of two different wavelengths. These beams are directed into a reaction cavity from multiple lasers by an optical system that requires each beam to pass through a single transparent window separating the lasing gas from the vacuum of the module chamber. The multiple lasers are positioned inside the chamber with lasing gas circulated through the resonators of the lasers serially from a common source. Spare lasers can be quickly substituted without interrupting the operation of the module.

It is to be understood that what has been described is merely illustrative of the principles of the invention and that numerous arrangements in accordance with this invention may be devised by one skilled in the art without departing from the spirit and scope thereof.

What is claimed is:

1. Apparatus for focusing high energy beams on a target from multiple laser sources, comprising:

a housing forming a vacuum chamber, a group of lasers positioned in a ring around the periphery of the housing, each laser including a resonant laser cavity defining a window therein and extending from said periphery into said chamber, fluid conduit means extending between and interconnecting each of said cavities for connecting all of said cavities in series to a lasing gas source, each cavity including mirror means mounted proximate said window for directing light generated in the respective cavities through said window into said vacuum chamber, mirror means mounted in said chamber for directing said beams from each of said cavities along a common axis, and target means positioned in said chamber along said common axis for receiving said beams.

2. Apparatus of claim 1 wherein said mirror means includes a first group of mirrors for directing beams from a portion of the lasers along closely spaced parallel axes, and beam multiplexing means receiving the beams along said parallel axes and directing the beams on a time shared basis along said common axis.

3. Apparatus of claim 2 further including a rotatable mirror positioned in the chamber to receive the beam from one of said lasers, a second group of mirrors positioned behind the first group of mirrors, means adjusting said rotatable mirror to direct the beam from said one of the lasers selectively to any one of said second group of mirrors, each mirror in the second group directing the beam along a corresponding one of said parallel axes, and means for selectively moving any one of the mirrors in said first group out of the beam path along said corresponding one of said parallel axes.

4. Apparatus of claim 1 wherein said target means includes an optical cavity mounted in the vacuum chamber, and means directing an active laser gas through the cavity from a source outside the vacuum chamber, the optical cavity having a window for receiving the laser beams directed along said common axis.

5. Apparatus of claim 1 further including a second group of lasers positioned in a second ring around the periphery of the housing, each laser of said second group including a laser cavity extending from said outer periphery into the chamber, fluid conduit means extending between the cavities of the second group of lasers for connecting the cavities to a second lasing gas source, the lasing gas from the second source producing a different light wavelength in the associated laser cavities than the light from the first-mentioned source, and mirror means in the chamber for directing beams from the cavities of said second group of lasers along a common axis directed at said target means.

* * * * *